June 13, 1967 G. S. DES BRISAY, JR 3,325,730
PULSE TIME JITTER MEASURING SYSTEM
Filed Dec. 23, 1963 5 Sheets-Sheet 1

INVENTOR.
GEORGE S. DES BRISAY JR.,
BY Walter J. Adams
ATTORNEY.

Patented June 13, 1967

3,325,730
PULSE TIME JITTER MEASURING SYSTEM
George S. Des Brisay, Jr., Manhattan Beach, Calif., assignor to Hughes Aircraft Company, Culver City, Calif., a corporation of Delaware
Filed Dec. 23, 1963, Ser. No. 332,798
3 Claims. (Cl. 324—68)

This invention relates to pulse jitter measuring systems and particularly to a highly accurate and reliable test circuit for providing direct indications of pulse time jitter.

Accurate and reliable measurements or indications of the jitter or varation in time of a plurality of pulse pairs is required for testing the reliability of systems and devices such as magnetrons, thyratrons or a series combination of a magnetron and a thyratron. The devices or systems may be tested to meet requirements that the time jitter be within certain permissible limits. For example, excessive magnetron jitter in a radar system degrades the range tracking operation, the angle tracking operation and the operation of automatic gain control loops within the system. Conventional pulse jitter measuring arrangements have been found to have many disadvantages such as being difficult to operate because of requiring an adjustment to a null condition for each jitter measurement, being highly sensitive to parameter changes and being relatively inaccurate because of variations caused by changes in shape of the input pulses. Also conventional pulse jitter measuring arrangements generally are unable to provide an R.M.S. (root-means-square) indication of the magnitude of random time jitter.

It is therefore an object of this invention to provide a reliable and accurate system for measuring successive time delays between pairs of pulses.

It is another object of this invention to provide a reliable and accurate system for converting the time delay between a pair of pulses to a signal level.

It is another object of this invention to provide a reliable and accurate time jitter test system for obtaining either direct R.M.S. or peak to peak indications of the variations of time delays between pairs of sequential pulses.

It is still another object of this invention to provide a system for testing the pulses developed by a device such as a magnetron to provide direct indications of the magnitude of pulse time jitter either on a display scope (peak to peak indications) or on a meter dial (peak to peak or R.M.S. indications).

It is a further object of this invention to provide an improved and reliable gated detector circuit.

The system in accordance with the principles of the invention responds to series of first and second pulses to form first and second normalized pulses which in turn control signal forming circuits that provide R.M.S. or peak to peak indications of the time jitter between successive pairs of the first and second pulses. The first normalized pulse is applied to a first multivibrator circuit which initiates a pulse that is terminated by a second multivibrator responding to the second normalized pulse. The pulse developed by the first multivibrator controls an integrator circuit which develops a signal level that is a function of the width of the multivibrator pulse and which is applied to a detector circuit gated by a pulse developed by the second multivibrator. The signal developed by the detector may be applied to an R.M.S. meter for providing an R.M.S. measurement of the pulse time jitter, or may be applied to an oscilloscope or a peak reading meter for peak to peak jitter measurements.

The novel features of this invention, as well as the invention itself, both as to its organization and method of operation, will best be understood from the accompanying description, taken in connection with the accompanying drawings, in which like reference characters refer to like parts, and in which.

Figure 1:
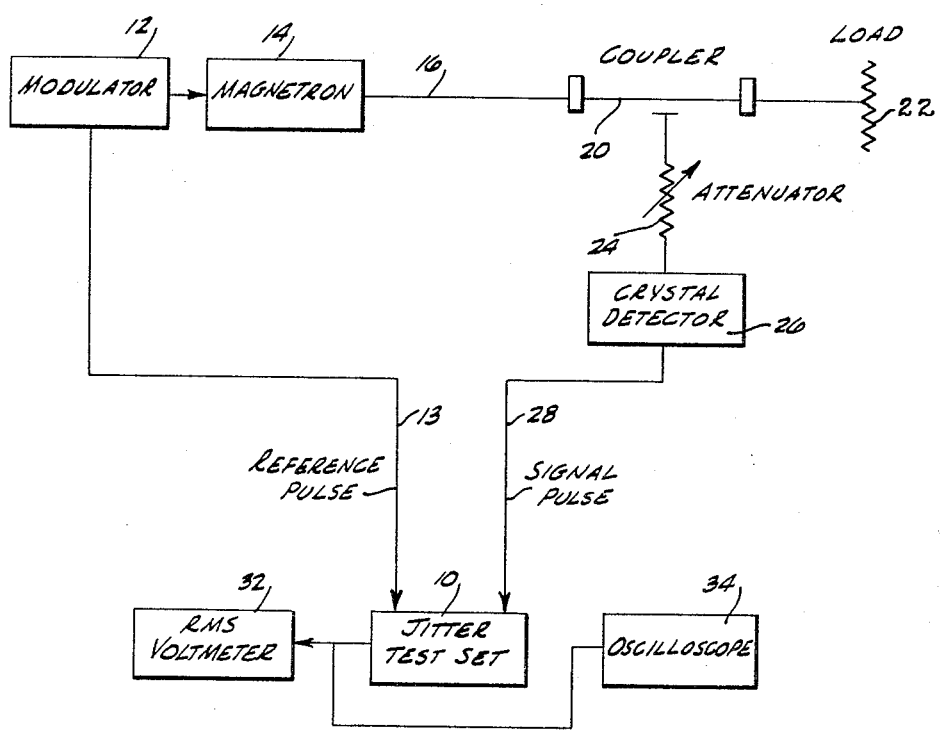
FIG. 1 is a schematic circuit and block diagram of a test arrangement in which the time jitter measuring system in accordance with the invention may be utilized.

Referring first to FIG. 1, an arrangement is shown in which a jitter test system or set 10 may be utilized in accordance with the principles of this invention to compare reference pulses developed by a modulator 12 with signal pulses or the envelopes of R.F. (radio frequency) pulses developed by a magnetron 14. The reference pulses are applied to the jitter test system 10 through a lead 13. The magnetron 14 responds to modulating pulses applied thereto from the modulator 12 to form the bursts of radio frequency or other high frequency energy that are applied through a suitable waveguide or conductor 16 to a coupler 20 which may be a 50 db coupler coupled to a load 22. An attenuator 24 may be coupled between the coupler 20 and a suitable envelope detector such as a crystal detector 26 which in turn is coupled through a lead 28 to the jitter test system 10. The time jitter magnitude between ocrresponding reference pulses and signal pulses may be displayed on an R.M.S. (root-means-square) voltmeter 32 to show an R.M.S. value of time jitter as function of time or on an oscilloscope 34 to show the peak to peak time jitter. The R.M.S. value of time jitter magnitude may be defined as the square root of the average of the voltage square as a function of time where the voltage is rep‧ resentative of the magnitude of the time jitter.

Figure 2:
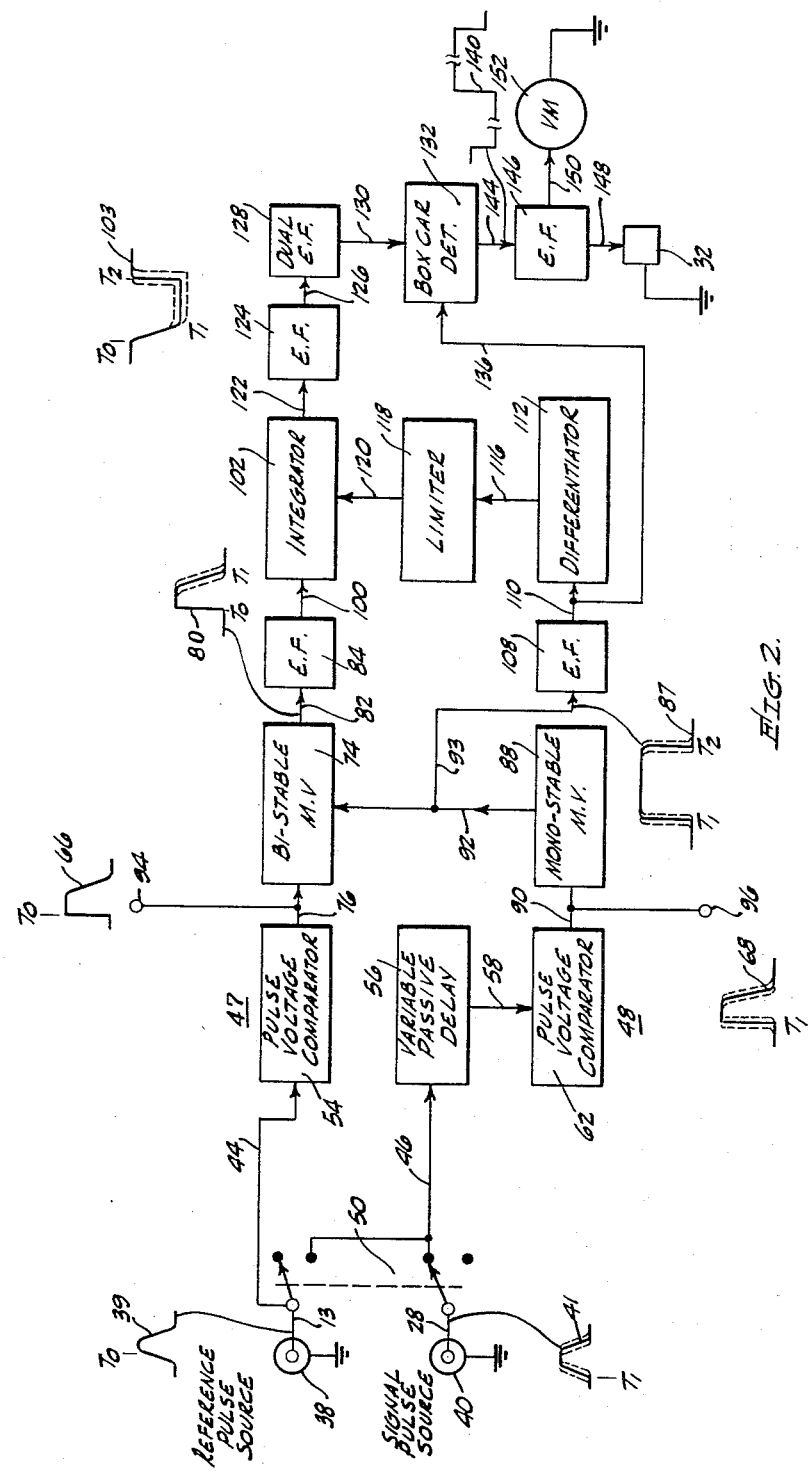
FIG. 2 is a block diagram of the jitter measuring system in accordance with the principles of the invention.

Referring now to FIG. 2, the pulse jitter test system 10 is responsive to pulses developed by a reference pulse source 38 and a signal pulse source 40 which may respectively be the modulator 12 and magnetron 14 of FIG. 1. However, the principles in accordance with this invention are not limited to a system for determining time jitter in a magnetron but may be utilized to determine time jitter in any device or system having a variation of relative time displacement between pulses of first and second pulse sequences. Also, it is to be noted that the system in accordance with the principles of the invention may be utilized to determine the time relation between single pairs of pulses by providing an indication on the oscilloscope 34 (FIG. 1). The reference source 38 applies a reference pulse of a waveform 39 through the lead 13 and a lead 44 to a reference pulse processing path 47 and the signal pulse source 40 applies a signal pulse of a waveform 41 through the lead 28 and a lead 46 to a signal pulse processing path 48. The dotted pulses of the waveform 41 are shown to indicate signal pulses jittered in time relative to the reference pulse with other dotted pulses of FIG. 2 shown to indicate the response of the system to the jittered signal pulses. In order to allow a measurement of intrinsic test set jitter, a self test switch 50 is provided to couple the lead 13 to the lead 46 and disconnect the lead 28 from the lead 46 so that the reference pulse is also utilized as the signal pulse.

The reference pulse of the waveform 39 is applied to a pulse voltage comparator circuit 54 and the signal pulse of the waveform 41 is applied through a variable delay circuit 56 and a lead 58 to a pulse voltage comparator circuit 62. The pulse voltage comparator circuits 54 and 62 are provided to normalize the amplitude and rise times of the reference and signal pulses in a similar manner to respectively form the pulses of the waveforms 66 and 68. This normalizing operation results in the system functioning substantially independently of amplitude and rise time variations of the input pulses. The delay circuit 56 which may be a tapped delay line allows the delay between a normalized reference pulse of a waveform 66 and the normalized signal pulse of the waveform 68 to be adjusted to an optimum delay compatible with the scale factors and the dynamic range of the system. It is to be noted that in some arrangements in accordance with the invention, the delay circuit 56 may not be required.

A bistable multivibrator circuit 74 responds to the leading edge of the pulse of the waveform 66 applied thereto from the voltage comparator 54 through a lead 76 to in turn apply a pulse of a waveform 80 through a lead 82 to an emitter follower circuit 84. The pulse of the waveform 80 is terminated by the operation of a monostable multivibrator 88 which responds to the leading edge of the normalized signal pulse of the waveform 68 applied thereto on a lead 90. The leading edge of the signal of a waveform 87 is applied from the monostable multivibrator 88 to a lead 92 for changing the state of the multivibrator 74 and terminating the pulse of the waveform 80. The delay circuit 56 may be adjusted when displaying the normalized reference pulse and signal pulse of the respective waveforms 66 and 68 on respective terminals 94 and 96.

The pulse of the waveform 80 is applied through the emitter follower 84 and a lead 100 to an integrator circuit 102 which may develop a negative ramp of a waveform 103 terminating at a voltage level determined by the time delay between the leading edges of pulses 66 and 68. The signal of the waveform 87 developed by the monostable multivibrator 88 is applied from the lead 92 through a lead 93, an emitter follower circuit 108 and a lead 110 to a differentiating circuit 112. A differentiated signal is developed from the trailing edge of the pulse of the waveform 87 and applied through a lead 116, a limiter circuit 118 and a lead 120 to the integrator 102 to restore the integrator to its original quiescent voltage level at the termination of each pulse comparison operation.

The integrated pulse of the waveform 103 is applied from a lead 122 through an emitter follower circuit 124 to provide current gain and through a lead 126 to a dual emitter follower circuit 128 to provide a low output impedance for changes of signal of either polarity. The signal developed by the dual emitter follower 128 is applied through a lead 130 to a box car or gated detector circuit 132 which, during the gating period, samples and holds a voltage representative of the lower voltage level of the waveform 103, that is, the voltage level at which the fall of the negative ramp voltage is terminated. The monostable multivibrator pulse of the waveform 87 is applied through a lead 136 to the box car detector 132 to provide the gating or energizing of the detector circuit.

The signal of a waveform 140 developed by the box car detector circuit 132 is applied through a lead 144 to an emitter follower circuit 146 and in turn through a lead 148 to the R.M.S. voltmeter 32 and through a lead 150 to a voltmeter 152. Also, the lead 148 or 150 may be coupled to the oscilloscope 34 of FIG. 1. The voltmeter 152 may be utilized to adjust the delay circuit 56 so that the system operates in a desired dynamic range. The voltage of the waveform 140 which is the detected level of the waveform 103 is maintained during the interpulse period of the pairs of pulses of the waveforms 39 and 41.

Figure 3:
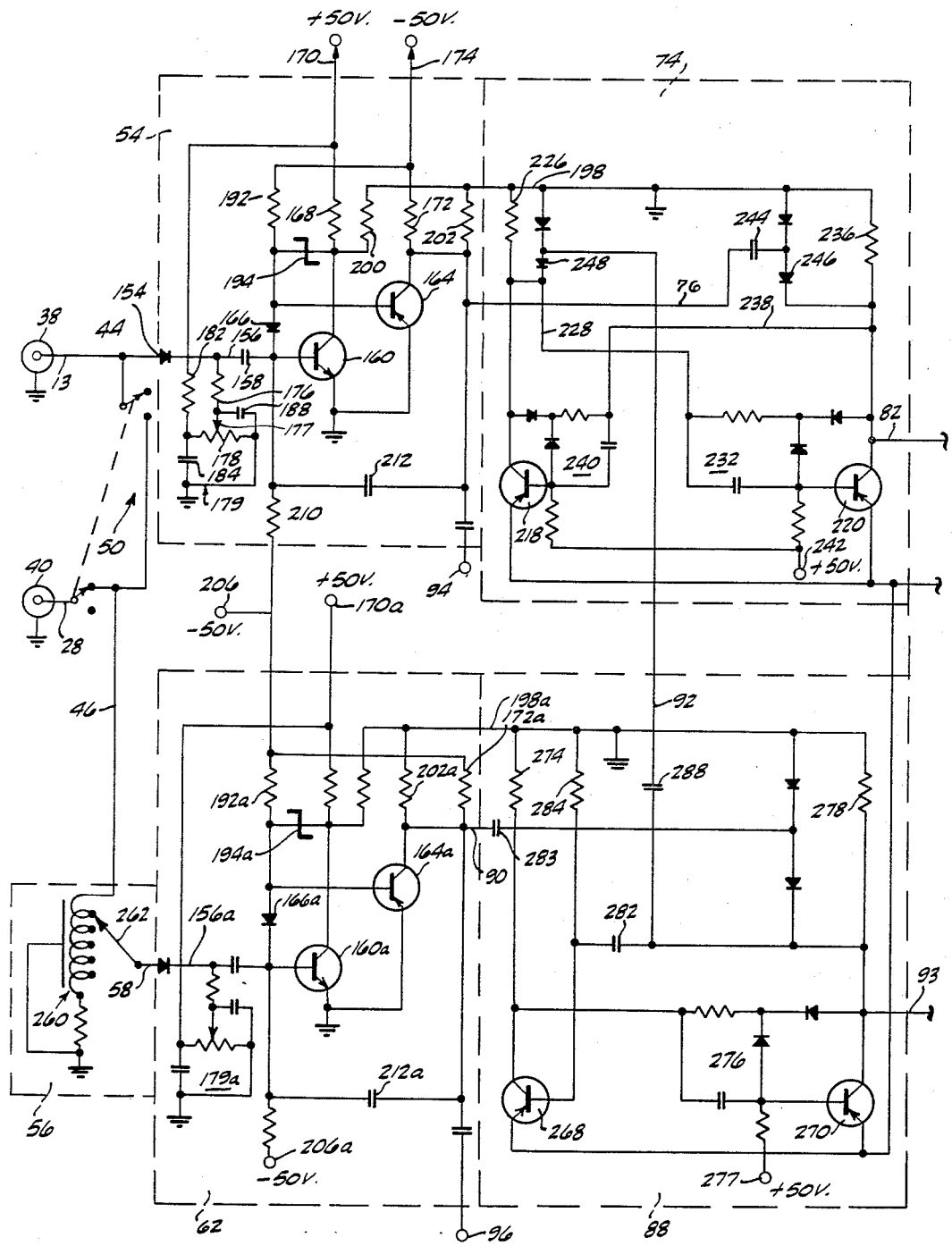
FIG. 3 is a schematic circuit diagram of circuit elements that may be utilized in a first portion of the jitter measuring system of FIG. 1.

Referring now to FIG. 3, the circuit elements utilized in the system of FIG. 2 in accordance with the principles of the invention, will be described in further detail. The reference pulse voltage comparator circuit 54 includes a diode 154 for being biased into conduction at a reference level, coupled between the lead 44 and a lead 156 for being biased into conduction at a selected threshold level. The lead 156 is coupled through a coupling capacitor 158 to the base of an npn type transistor 160. The emitter of the transistor 160 is coupled to ground and the collector is coupled through a resistor 168 to a suitable source of potential such as a +50 volt terminal 170. A pnp type transistor 164 which is normally biased out of conduction is provided with a base coupled through the anode to cathode path of a diode 166 to the base of the transistor 160, the emitter coupled to ground and the collector coupled to a resistor divider including a resistor 172 coupled to a suitable negative source of potential such as a —50 volt terminal 174 and a resistor 202 coupled to a ground reference lead 198. An adjustable reference level circuit 179 is provided to develop a voltage level on the lead 156 at which the diode 154 is biased into conduction to allow a signal to be applied to the base of the transistor 160. The reference level circuit 179 includes a resistor 176 coupled between the lead 156 and a movable tap 177 contacting a resistor 178 of a potentiometer arrangement, for example. A first end of the resistor 178 is coupled through a resistor 182 to the +50 volt terminal 170 and through a filter capacitor 184 to ground. The resistor 176 is also coupled through a filter capacitor 188 to ground. The base of the transistor 164 is coupled through a biasing resistor 192 to the terminal 174 and through the anode to cathode path of a zener diode 194 to the collector of the transistor 160. Current conduction through the zener diode 194 and the diode 166 maintains the transistor 160 normally biased in the linear region of operation. The collector of the transistor 160 is coupled to the ground reference lead 198 through the resistor 200. The base of the transistor 160 is coupled to a suitable source of potential such as a —50 volt terminal 206 through a biasing resistor 210 to assure that the diodes 194 and 166 are maintained in conduction. A feedback capacitor 212 is coupled from the lead 76 to the base of the transistor 160. A suitable coupling capacitor is provided between the lead 76 and the normalized reference pulse terminal 94.

Figure 4:
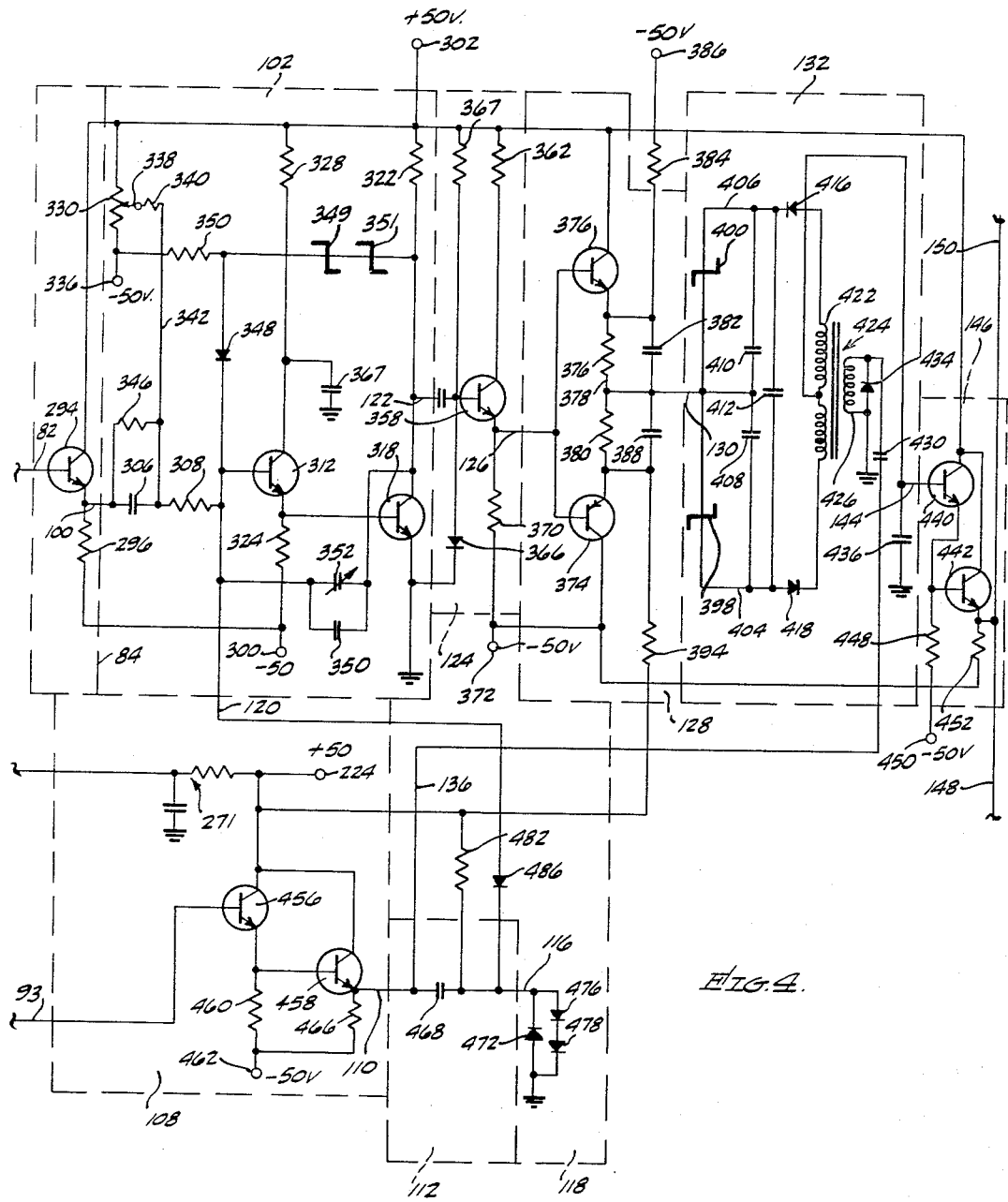
FIG. 4 is a schematic circuit diagram of circuit elements in accordance with the principles of the invention including a gated box car detector circuit that may be utilized in a second portion of the jitter measuring system of FIG. 1.

The bistable multivibrator 74 includes pnp type transistors 218 and 220 which in system operation are normally in respective conductive and nonconductive conditions. The emitters of the transistors 218 and 220 are coupled to a suitable source of potential such as a +50 volt terminal 24 (FIG. 4). The collector of the transistor 218 is coupled through a resistor 226 to a lead 198 and through a lead 228 and a suitable cross coupling circuit 232 to the base of the transistor 220. The collector of the transistor 220 is coupled through a resistor 236 to the ground lead 198 and through a lead 238 and a suitable cross coupling circuit 240 to the base of the transistor 218. Appropriate biasing arrangements are provided at the bases of the transistors 218 and 220 which are coupled to a suitable source of potential such as a +50 volt terminal 242.

The normalized reference pulse of the waveform 66 (FIG. 2) is applied through the lead 76, a coupling capacitor 244 and a diode 246 to the collector of the transistor 220 to bias the transistor 218 out of conduction and apply a negative going signal to the lead 228 to bias the transistor 220 into conduction. The multivibrator 74 is "shut off" or triggered to the restored state in response to a pulse of the waveform 87 (FIG. 2) applied from the multivibrator 88 through the lead 92 and a diode 248 to bias the transistor 220 out of conduction. In response to the transistor 220 being biased out of conduction, a negative going signal is applied to the lead 238 to bias the transistor 218 into conduction. Other circuit elements are provided to develop a reliable multivibrator operation.

The pulse of the waveform 80 (FIG. 2) is applied from the collector of the transistor 220 through the lead 82 to the emitter follower circuit 84 of FIG. 4. However, before further explaining the reference pulse path 46, the first portion of the signal pulse path 48 will be explained as shown in FIG. 3. The delay circuit 56 may include a conventional inductive-capacitive delay line coupled to the lead 46 and having taps at different positions of the inductive element. A movable arm 262 may be coupled to the lead 58 and selectively connectable to the taps. The delayed signal pulse or undelayed pulse when the arm 262 is in the position shown, is applied through the lead 58 to the pulse voltage comparator circuit 62. Because the voltage comparator circuit 62 is similar to the reference pulse voltage comparator circuit 54, similar elements are designated with the same reference numerals except with the letter "a" following the numeral. The resistors 172a and 192a are coupled to the —50 volt terminal 206a in the voltage comparator 62. The terminal 96 is coupled through a capacitor to the lead 90 for receiving the normalized signal pulse in response to the operation of the transistors 160a and 164a.

The monostable multivibrator 88 includes pnp type transistors 268 and 270 which are normally in respective conductive and nonconductive conditions. The emitters of the transistors 268 and 270 are coupled to the +50 volt terminal 224 (FIG. 4). A suitable filter arrangement 271 may be provided at the terminal 24. The collector of the transistor 268 is coupled through a resistor 274 to a ground lead 198a as well as being cross coupled through a suitable triggering circuit 276 to the base of the transistor 270. The triggering circuit 276 may be coupled to a suitable source of potential such as a +50 volt terminal 277. The collector of the transistor 270 is coupled through a resistor 278 to the lead 198a as well as to the base of the transistor 268 through a timing capacitor 282. The base of the transistor 268 is also coupled to the lead 198a through a timing resistor 284. Thus, in response to a positive pulse applied to the lead 90 and through a coupling capacitor 283, the transistor 268 is biased out of conduction which in turn biases the transistor 270 into conduction. After a time period during which the capacitor 282 is discharged by current flowing through the resistor 284, the transistor 268 is biased back into conduction and the transistor 270 out of conduction to terminate the pulse of the waveform 87 (FIG. 2). During the period that the transistor 270 is conducting, the positive multivibrator pulse of the waveform 87 is applied both through the lead 93 to the emitter follower 108 of FIG. 4 and is applied through a coupling capacitor 288 to the lead 92 to restore the state of the bistable multivibrator 74 so as to terminate the multivibrator pulse of the waveform 80 (FIG. 2).

Referring now principally to FIG. 4, the emitter follower circuit 84 of the reference pulse path 46 includes an npn type transistor 294 having a base coupled to the lead 82, an emitter coupled through a resistor 296 to a suitable source of potential such as a —50 volt terminal 300 and a collector coupled to a suitable source of potential such as a +50 volt terminal 302. The emitter follow circuit 84 applies a current amplified multivibrator pulse to the integrator circuit 102 through the lead 100, a coupling capacitor 306 and a resistor 308 to the base of an npn type transitor 312 arranged as an emmitter follower. Also included in the integrator circuit 102 to provide the amplifying operation is an npn type transistor 318 having a base coupled to the emitter of the transistor 312, an emitter coupled to ground and a collector coupled through a resistor 322 to the +50 volt terminal 302. The emitter of the transistor 312 is also coupled through a resistor 324 to the —50 volt terminal 300 and the collector of the transistor 312 is coupled through a resistor 328 to the terminal 302.

An integrator zero adjusting resistor 330 is coupled between the +50 volt terminal 302 and a —50 volt terminal 336 and includes a movable tap 338 coupled from the resistor 330 through a lead 342 to the resistor 308. A biasing resistor 346 is coupled between the lead 342 and the emitter of the transistor 294. The base of the transistor 312 is also coupled through the cathode to anode path of a diode 348 and a resistor 350 to the —50 volt terminal 336. The anode of the diode 348 is also coupled through zener diodes 349 and 351 to the resistor 322 to provide a stabilizing current flowing through the diode 348 for maintaining the transistor 312 biased in the linear region of operation. The collector of the transistor 318 is further coupled through a parallel connected capacitor 350 and adjustable capacitor 352 to the base of the transistor 312 to provide positive feedback of the amplified signal and to develop the integration action. The capacitor 352 allows adjustment to a desired scale factor of the time jitter relative to the voltages developed by the detector 132. A by-pass capacitor 367 is coupled between the collector of the transistor 312 and ground. The integrator is restored to its original quiescent voltage level in response to a differentiated pulse applied from the limiter 118 through the lead 120 to the base of the transistor 312 and to the capacitors 350 and 352.

The ramp voltage of the waveform 103 (FIG. 2) is applied from the lead 122 through a suitable coupling capacitor to the base of an npn type transistor 358 of the emitter follower circuit 124. The collector of the transistor 358 is coupled through a resistor 362 to the +50 volt terminal 302 and the base of that transistor is coupled through the anode to cathode path of a diode 366 to ground as well as through a biasing resistor 367 to the terminal 302. The emitter of the transistor 358 is coupled through a resistor 370 to a suitable source of potential such as a —50 volt terminal 372 as well as to the dual emitter follower 128 through the output lead 126.

The dual emitter follower circuit 128 includes a pnp type transistor 374 and an npn type transistor 376 both having bases coupled to the lead 126. The collector of the transistor 376 is coupled to the +50 volt terminal 302 and the emitter is coupled through a resistor 376, a lead 378 and a resistor 380 to the emitter of the transistor 374. The collector of the transistor 374 is coupled to the —50 volt terminal 372. A coupling capacitor 382 is coupled both to the emitter of the transistor 376 and through a resistor 384 to a —50 volt terminal 386 at one end and is coupled to both the lead 378 and the output lead 130 at the other end. A similar coupling capacitor 388 is coupled at one end to the lead 378 and at the other end to both the emitter of the transistor 374 and through a resistor 394 to the +50 volt terminal 224. The circuit 128 provides a low output impedance for both positive and negative going signals applied to the lead 130.

The gated box car detector 132 includes first and second zener diodes 398 and 400 respectively having a cathode and an anode coupled to the lead 130, and respectively having an anode and cathode coupled to leads 404 and 406. The zener diode 398 and 400 may be selected to provide substantially equal voltage drops. Also, the zener diodes 398 and 400 may have different voltage drop characteristics resulting only in the voltage on a storage capacitor 436 having a constant offset value. Series coupled storage capacitors 408 and 410 as well as a high frequency by-pass capacitor 142 are coupled in parallel between the leads 404 and 406 with the lead 130 coupled to a point between the capacitors 408 and 410. The capacitors 408 and 410 maintain voltage drops thereacross equal to the voltage drops across respective zener diodes 398 and 400. The stored voltage levels on the capacitors 408 and 410 are referenced to the voltage applied to the lead 130 by the integrator 102. The leads 404 and 406 are respectively coupled through a unidirectional current conductive device such as through a cathode to anode path of a diode 416 and an anode to cathode path of a diode 418 to opposite ends of a first winding 422 of the transformer 424. A second winding 426 of the transformer 424 has one end coupled to ground and the other end coupled through a coupling capacitor 430 to the lead 136 to be gated during the period of the monostable multivibrator pulse of the waveform 87 (FIG. 2) so that both diodes 416 and 418 are biased into conduction. The capacitors 408 and 410 charge during the gating period to values determined by the voltage on the lead 130 and the voltage drops across the zener diodes 398 and 400. A diode 434 may be coupled across the winding 426 to prevent overshoot in response to the gating pulse. The detected DC voltage is applied from a center tap of the winding 422 through the lead 144 to be stored on the storage capacitor 436 during the interpulse periods. The stored voltage is applied on the lead 144 to the emitter follower circuit 146.

The emitter follower circuit 146 includes npn type transistors 440 and 442 with the base of the transistor 440 coupled to the lead 144, the collector thereof coupled to the terminal 302 and the emitter coupled to the base of the transistor 442 as well as through a resistor 448 to a −50 volt terminal 450. The collector of the transistor 442 is coupled to the collector of the transistor 440 and the emitter of the transistor 442 is coupled through a resistor 452 to the −50 volt terminal 372. The leads 150 and 148 which are coupled to the emitter of the transistor 442 apply detected voltage levels to the voltage meter 152, to the R.M.S. voltmeter 32 of FIG. 2 or to the oscilloscope 34 of FIG. 1, for example. Also in accordance with the principles of the invention, the signal on the leads 150 and 148 is not limited to controlling display devices but may be utilized in suitable control circuits.

The emitter follower circuit 108 of the signal pulse path 48 includes npn type transistors 456 and 458 with the transistor 456 having a base coupled to the lead 93, a collector coupled to the +50 volt terminal 224 and an emitter coupled through a resistor 460 to a suitable source of potential such as a −50 volt terminal 462. The transistor 458 has a base coupled to the emitter of the transistor 456, a collector coupled to the terminal 224 and an emitter coupled to the lead 110 as well as through a resistor 466 to the terminal 462. The emitter of the transistor 458 is also coupled to the lead 110 as well as to the lead 136 to apply gating pulses of the waveform 87 (FIG. 2) to the box car detector 132.

The differentiating circuit 112 includes a capacitor 468 having one end coupled to the lead 110 and the other end coupled to the lead 116 which in turn is coupled to ground through the cathode to anode path of a diode 472 of the limiter circuit 118. The diode 472 provides limiting of the negative differentiated pulse on the lead 116. The differentiating circuit 112 also includes a resistor 482 coupled between the lead 116 and the +50 volt terminal 224.

The limiter 118 may also include diodes 476 and 478 coupled in series from the lead 116 to ground to establish the positive differential signals at a desired low level. The lead 116 is coupled through the cathode to anode path of a diode 486 to the lead 120 and the integrator circuit 102 to pass only negative differentiation pulses therethrough.

Figure 5:
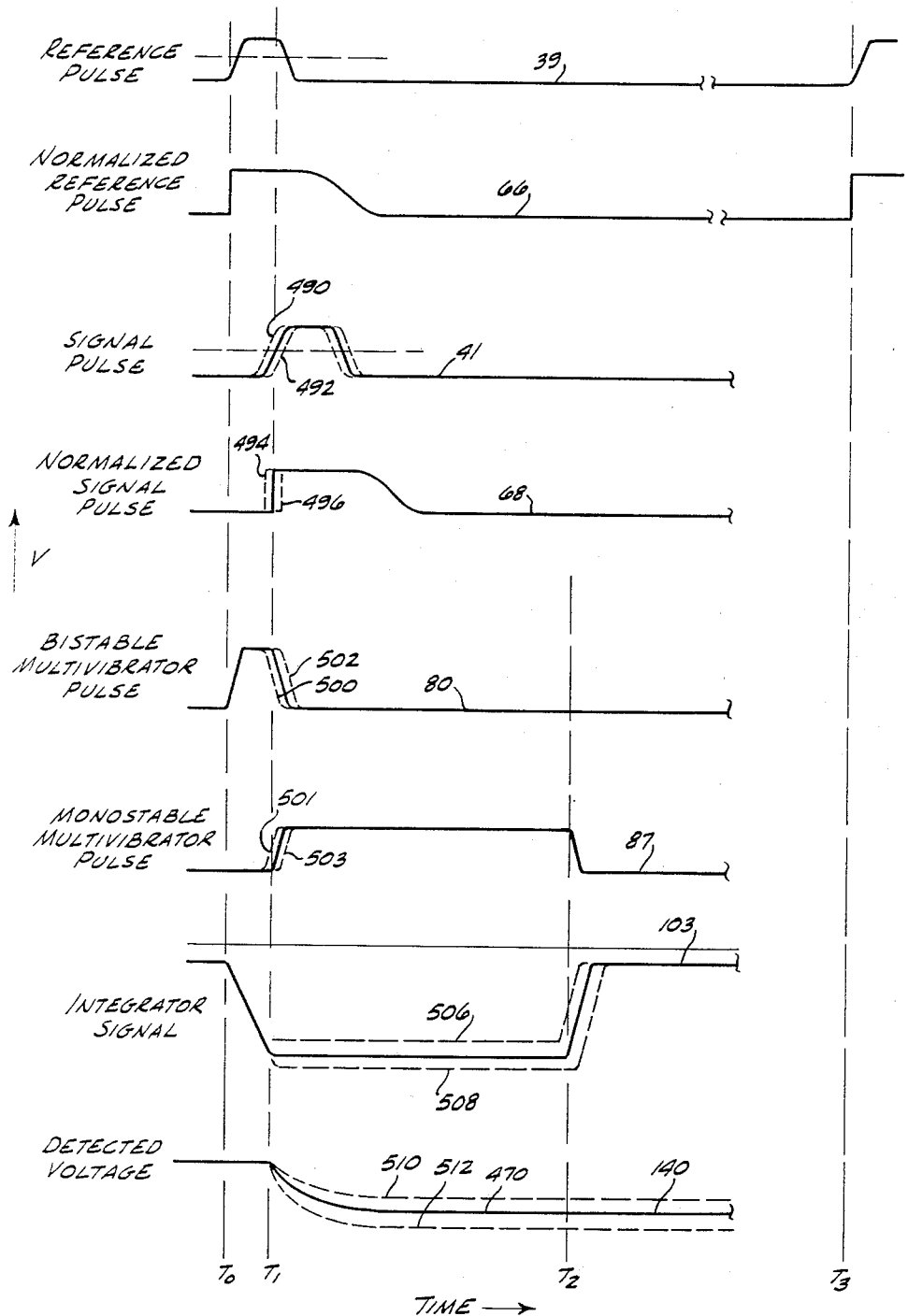
FIG. 5 is a diagram of waveforms showing voltage as a function of time for further explaining the operation of the measuring system of FIG. 2.

Referring now to the waveforms of FIG. 5 as well as to FIGS. 3 and 4, the operation of the test system will be explained in further detail. The reference pulse of the waveform 39 may be applied to the lead 44 at a time shortly before time $T_0$. When the reference pulse on the lead 44 rises to a comparator threshold level at time $T_0$ as determined by the setting of the threshold level circuit 179, the diode 154 is forward biased and the transistor 160 is biased into further conduction. As a result, the voltage at the base of the transistor 160 falls and the voltage at the cathode of the diode 166 is decreased to bias the normally nonconducting transistor 164 into conduction. When the transistor 164 starts to conduct, a positive feedback loop through the capactior 212 to the base of the transistor 160 is closed resulting in the pulse of the waveform 66 being generated at the collector of the transistor 164 with a fast rise time. Thus, the positive normalized reference pulse of the waveform 66 is applied to the lead 76 with a relatively short rise time. The bistable multivibrator circuit 74 is normally maintained in a state with the transistor 218 biased in conduction and the transistor 220 biased out of conduction. In response to the pulse of the waveform 66 rising from approximately −50 volts substantially to ground level on the lead 76 and being applied through the diode 246 to the lead 238, the transistor 218 is biased out of conduction and the voltage on the lead 228 falls toward ground to bias the transistor 220 into conduction and apply a positive pulse of the waveform 80 to the lead 82. It is to be noted that the dotted portions of the waveforms such as 80 are to indicate different time jitter conditions as will be explained in further detail subsequently.

In response to the positive pulse applied to the base of the transistor 294, that transistor is biased into increased conduction in the linear region of operation and a positive pulse is applied to the lead 100 and to the integrator circuit 102. Thus, the transistor 312 is biased into increased conduction and the voltage rises at the emitter thereof to bias the transistor 318 into increased conduction. As the voltage rises on the collector of the transistor 318 a negaive feedback signal is applied through the capacitors 350 and 352 to control the rate of increased conduction. Thus, a negative voltage ramp of the waveform 103 is developed on the lead 122 in response to the positive pulse applied to the lead 100.

At a time shortly before a time $T_1$, the signal pulse (shown solid) of the waveform 41 is applied to the lead 46 which signal may be the RF envelope developed by the crystal detector 26 of FIG. 1, for example. For purposes of explanation it is to be assumed that the tap 262 of the delay circuit 56 is in the position shown, and a delay thereat is not utilized in the operation. In response to the pulse of the waveform 41, the transistor 160a is biased into increased conduction at a threshold level at time $T_1$ determined by the bias applied to the lead 156a by the reference circuit 179a. The bias developed by the reference circuits 179 and 179a may be selected at substantially one-half of the voltage peak level of the waveforms 39 and 41 so that variations in pulse shape have a minimum effect on the time of triggering the multivibrators 74 and 88 and the measurement of jitter time. When the transistor 160a is biased into increased conduction, the transistor 164a is biased into conduction, and a normalized signal pulse of the waveform 68 is applied to the lead 90 with a fast rise time insured by the feedback signal applied through the capacitor 212a.

The monostable multivibrator 88 is normally in a stable condition with the transistor 268 conducting and the transistor 270 biased out of conduction. In response to the normalized pulse of the waveform 68, the transistor 268 is biased out of conduction as the positive pulse is applied through the capacitor 282 and the transistor 270 is biased into conduction as the voltage at the collector of the transistor 268 decreases and is impressed on the base of the transistor 268. Thus, the positive pulse of the waveform 87 is applied to the lead 93, starting to rise substantially at time $T_1$. Shortly after time $T_1$, the positive voltage pulse of the waveform 87 applied to the lead 92, restores the bistable multivibrator 74 to bias the transistor 220 out of conduction as the pulse is applied through the lead 228 to the base thereof. As a result, the pulse of the waveform 80 falls in level and the integrator voltage of the waveform 103 (negative level shown solid) is established as the amplifying and integrating operation is terminated.

Between times $T_1$ and $T_2$, the box car detector circuit 132 is gated in response to the pulse of the waveform 87 being applied through the emitter follower circuit 108 and the lead 136 to the winding 426. As a result, positive and negative voltages are applied to the anode and cathode of respective diodes 416 and 418 which are biased into conduction so that the capacitors 408 and 410 are charged to voltages referenced to the voltage on the output lead 130 of the dual emitter follower circuit 128. A voltage determined by the voltages established across the capacitors 408 and 410 is applied to the capacitor 436 and stored thereat. It is to be noted that even if the constant voltage drops across the zener diodes 398 and 400 are different from each other, the circuit operates reliably because a constant DC offset voltage is always established on the storage capacitor 436 during operation. The capacitors 408 and 410 maintain the zener diodes 398 and 400 at a biased point of conduction during interpulse periods because voltage differentials are maintained thereacross equal to the voltage drops of respective zener diodes 398 and 400. At time $T_2$ when the pulse of the waveform 87 is terminated, the diodes 416 and 418 are biased out of conduction. The box car detector 132 in accordance with the invention operates with a minimum of leakage current which is substantially only the base current applied to the transistor 440 and the reverse leakage through the diodes 416 and 418. As can be seen by the waveform 140, a voltage level 470 is established on the capacitor 436 shortly after time $T_1$. It is to be noted that although the waveform 140 shows a change of voltage to a lower level shortly after time $T_1$, the operation is similar when the detector 132 changes to a higher level in response to a multivibrator pulse of the waveform 80 being of a shorter time duration than the multivibrator pulse of the previous time comparison. The voltage level of the waveform 140 is applied through the emitter follower circuit 146 to the R.M.S. meter 32 (FIG. 2), for example.

Also at time $T_1$, the pulse of the waveform 87 after being applied to the emitter follower circuit 108 to bias the transistors 456 and 458 into further conduction is then applied to the differentiating circuit 112. A small differentiated positive pulse (not shown) applied to the lead 116 at time $T_1$, is prevented from being passed to the lead 120 because the diode 486 is back biased. At time $T_2$, a negative differentiated pulse (not shown) is applied through the diode 486 to restore the integrator circuit 102 by providing a discharge path of the capacitors 350 and 352 through the diode 486, the lead 120 and the resistor 322 as the transistors 312 and 318 are biased out of conduction. This negative differentiated pulse on the lead 120 is limited in amplitude by the drop across the diode 472.

The voltage level of the waveform 140 is maintained until the start of the next pulse period at a time $T_3$ because of the relatively small leakage of the detector circuit 132. For example, the period between times $T_1$ and $T_2$ may be 10 microseconds and the period between times $T_2$ and $T_3$ may be 1000 microseconds with a substantially small change of the voltage level of the waveform 140.

Dotted pulse 490 and 492 of the waveform 41 show two other time jitter conditions of the signal pulse which form respective normalized pulses 494 and 496 shown dotted in the waveform 68. In response to the pulses 494 and 496, the bistable multivibrator pulse of the waveform 80 is terminated either earlier or later than time $T_1$ as shown by the dotted pulses 500 and 502, in response to respective pulses 501 and 503 of the waveform 87 developed by the monostable multivibrator 88. When the pulses 500 and 502 are developed by the bistable multivibrator 74, the output level of the integrator shown by dotted levels 506 and 508 of the waveform 103 are respectively higher and lower to charge the storage capacitor 436 to respective dotted levels 510 and 512. At each subsequent pulse time such as time $T_3$, a different voltage level such as 510 and 512 may be applied to the R.M.S. meter 32 (FIG. 2) which displays a true R.M.S. reading of time jitter, thus providing a direct indication of R.M.S. time jitter. Also, the peak to peak value of the jitter may be read from a calibrated screen of the oscilloscope 34 of FIG. 1.

In operation, the integrator zero adjustment is set by properly positioning the arm 338 of the integrator circuit 102. The scale factor of the system is adjusted by varying the capacitor 352 to change the slope of the ramp voltage of the waveform 103 so that a desired voltage amplitude change of the waveform 140 represents a desired time displacement change between the reference and the signal pulses of the respective waveforms 39 and 41. In order that the system operate in a desired dynamic range for a jitter magnitude to be measured, the delay of the delay circuit 56 is selected. Therefore, the system in accordance with the invention operates with only a minimum of initial adjustments.

Thus there has been described a jitter determining system utilizing semiconductor elements which converts successive time delays between first and second pulses into box car detected voltage levels which can be read from an R.M.S. voltage meter as an indication of the R.M.S. jitter magnitude. The system operates by processing the input pulses through pulse normalizing circuits so that the reliability of time measurements is substantially independent of variations of the shapes of the input pulses. The improved gated box car detector circuit in accordance with the invention provides highly accurate voltage storage and determinations of the time displacement between pairs of pulses. The system, which may be utilized either to determine the time difference between two pulses or the magnitude of the time variations between a plurality of pairs of pulses, operates substantially independently of critical adjustments.

What is claimed is:

1. A system for determining the time relation between first and second pulses comprising
   first and second normalizing means respectively responsive to said first and second pulses for respectively developing third and fourth pulses when said first and second pulses rise to predetermined signal levels,
   bistable means coupled to said first normalizing means for initiating the formation of a fifth pulse in response to said third pulse,
   monostable means coupled between said second normalizing means and said bistable means for responding to said fourth pulse to terminate said fifth pulse,
   integrator means coupled to said bistable means for establishing a signal level as a function of the duration of said fifth pulse,
   gated detecting means coupled between said integrator means and said monostable means to respond during a period determined by said monostable means for storing the signal level established by said integrator means,
   and indicating means coupled to said detector means and responsive to said stored signal level.

2. A system for determining the time jitter between corresponding pulses of a series of reference pulses and a series of signal pulses with each of the signal pulses occurring later in time than the corresponding reference pulse comprising
   first voltage comparator means responsive to a selected level of said reference pulses to develop normalized reference pulses having leading edges with a relatively short rise time,
   second voltage comparator means responsive to a selected level of said signal pulses to develop normalized signal pulses having leading edges with a relatively short rise time,
   a bistable multivibrator coupled to said first voltage comparator means for initiating a pulse in response to the leading edge of said normalized reference pulse,
   a monostable multivibrator coupled between said second voltage comparator means and said bistable multivibrator for responding to the normalized signal pulse to develop a pulse with the leading edge that terminates the pulse developed by said bistable multivibrator, an integrator coupled to said bistable multivibrator for developing a voltage level as a function of the time of duration of the pulse developed by said bistable multivibrator, a gated detector coupled to said integrator and to said monostable multivibrator for developing and storing a voltage level as a function of the voltage level developed by said integrator during the period of the pulse developed by said monostable multivibrator, a differentiator coupled between said monostable multivibrator and said integrator for developing a differentiated pulse in response to the trailing edge of the pulse developed by said monostable multivibrator to change said integrator to a restored level, and indicating means coupled to said detector for providing root-mean-square indications of the time jitter between corresponding pulses of the series of reference pulses and signal pulses.

3. A system for determining the time jitter between corresponding pulses of a series of reference pulses and a series of signal pulses from respective reference and signal sources comprising self test switching means coupled to the reference pulse source and said signal source for selectively applying said reference pulses and said signal pulses to respective first and second terminals or said reference pulses to both said first and second terminals, first pulse forming means including a feedback means and coupled to said first terminal to respond to a selected level of said reference pulses to develop normalized first pulses having leading edges with relatively short rise times, delay means coupled to said second terminal and responsive to said signal pulses, second pulse forming means including a feedback means and coupled to said delay means to respond to a selected level of said signal pulses or said reference pulses to develop normalized second pulses having leading edges with relatively short rise times, a bistable multivibrator coupled to said first pulse forming means for initiating a pulse in response to the leading edge of said normalized first pulse, a monostable multivibrator coupled between said second pulse forming means and said bistable multivibrator for responding to the normalized second pulse to develop a pulse with the leading edge that terminates the pulse developed by said bistable multivibrator, an integrator coupled to said bistable multivibrator for developing a voltage level as a function of the time of duration of the pulse developed by said bistable multivibrator, a gated detector including a storage capacitor coupled to said integrator and to said monostable multivibrator for developing and storing voltage levels as a function of the voltage level of said integrator during the period of the pulse developed by said monostable multivibrator, a differentiator coupled between said monostable multivibrator and said integrator for developing a differentiated pulse in response to the trailing edge of the pulse developed by said monostable multivibrator to change said integrator to a restored level, and indicating means coupled to said box car detector for providing indications of the time jitter between corresponding pulses of the series of reference pulses and signal pulses or substantially of the intrinsic jitter of said system.

References Cited

UNITED STATES PATENTS

| | | | |
|---|---|---|---|
| 2,563,879 | 8/1951 | Soukaras | 324—68 |
| 3,059,179 | 10/1962 | Heaton | 324—68 |
| 3,177,428 | 4/1965 | Klayman | 324—83 X |
| 3,205,438 | 9/1965 | Buck | 324—83 |

WALTER L. CARLSON, *Primary Examiner.*

P. F. WILLE, *Assistant Examiner.*